June 17, 1930.    F. R. BISHOP    1,765,123
OPHTHALMIC MOUNTING AND METHOD OF MAKING THE SAME
Filed March 14, 1928
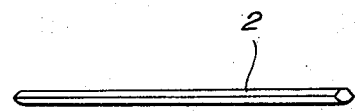
Fig. 1
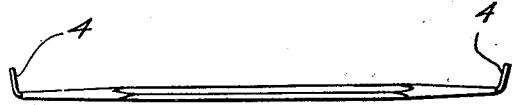
Fig. 2
Fig. 3
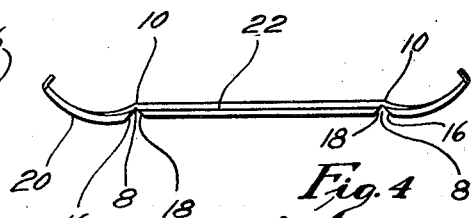
Fig. 4
Fig. 12
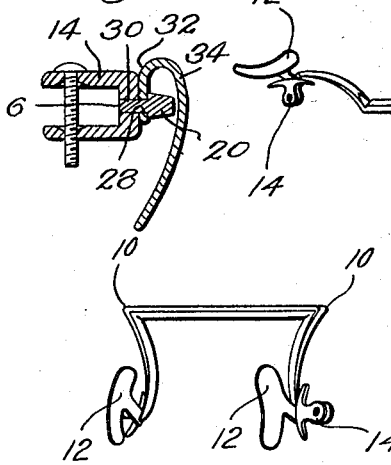
Fig. 6
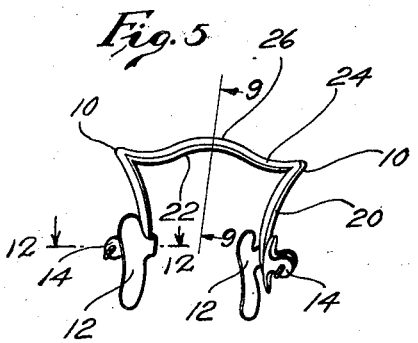
Fig. 7
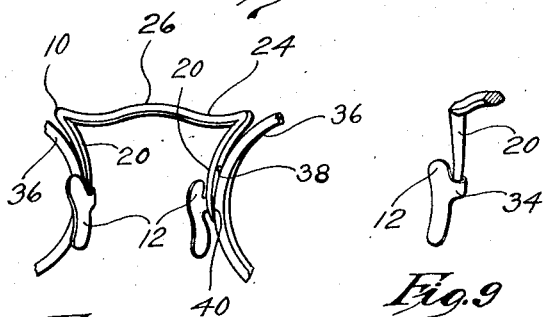
Fig. 8    Fig. 9
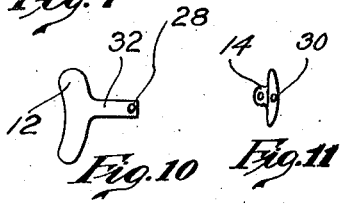
Fig. 10    Fig. 11
Inventor
Frederick R. Bishop
By David Rines
Attorney Patented June 17, 1930

1,765,123

UNITED STATES PATENT OFFICE

FREDERICK RICE BISHOP, OF NORTH ATTLEBORO, MASSACHUSETTS, ASSIGNOR TO THE BISHOP COMPANY, OF NORTH ATTLEBORO, MASSACHUSETTS, A CORPORATION OF MASSACHUSETTS

OPHTHALMIC MOUNTING AND METHOD OF MAKING THE SAME

Application filed March 14, 1928. Serial No. 261,687.

The present invention relates to ophthalmic mountings and to methods of making the same.

The invention will be explained in connection with the acompanying drawings in which Fig. 1 is a perspective view of a bar from which a preferred bridge may be manufactured, as illustrated in other figures; Figs. 2, 3 and 4 are diagrammatic views representing successive stages in the preferred method of manufacture; Fig. 5 is a view, corresponding to Fig. 4, showing the nose guards and lens-holding clamps attached; Figs. 6 and 7 represents subsequent steps in the preferred method of manufacture; Fig. 8 is a view of a modification; Fig. 9 is a section taken upon the line 9—9 of Fig. 7, looking in the direction of the arrows; Figs. 10 and 11 are views, respectively, of a guard and lens-holding clamp; and Fig. 12 is a section taken upon the line 12—12 of Fig. 7, looking in the direction of the arrows.

In manufacturing an opthalmic bridge in accordance with the present invention, a bar 2 is first reduced at the ends and the reduced ends bent upward, as shown at 4. The projecting portions of the reduced ends 4 are cut away, as shown at 6, and V-shaped notches or incisions are then cut at 8. The notches 8 are made in the inner or lower side or edge of the bar 2, and terminate at a point removed from the outer or upper edge of the bar 2, so as to leave portions 10 of the bar, adjacent to the outer edge of the bar, uncut near the verteces of the V's 8. Guards 12 and lens-holding members 14 are then secured to the reduced ends 6 in a manner hereinafter described, as shown in Fig. 5, after which the bar is bent at the verteces 10 so as to make the faces 16 and 18 of each V-shaped notch 8 contact, as shown in Fig. 6. A mitred joint is thus produced at each vertex, which terminates at a point intermediate between the inner and outer edges of the bar 2, by reason of the fact that the portion of the bar 2 near the outer edge of the bar was left uncut when the V-shaped notch 8 was made. The portions 20 and 22 of each bar member on each side of the portion 10 are then integrally secured together by solder or in any other manner, as shown in Fig. 6, after which the intermediate portion 22 of the bar is bent upward and outward away from the wearer's forehead, but with a point of inflexion at 24 between the middle point 26 of the intermediate portion 22 and each portion 10, as shown in Fig. 7. Adjustment for pupilary distance may be effected by bending the intermediate portion 22 in and out between the points of inflexion 24. The outwardly bent portion at the middle point 26 prevents contact with the wearer's forehead. The resulting bridge is constituted of an intermediate or cross portion 22 and two depending end portions 20 joined together at a very sharp angle or corner by a mitred joint at 10.

An opening 28 is cut in the arm 32 of each guard 12, and an opening 30 in each lens-holding clamp 14. A guard 12 and a lens-holding clamp 14 are superposed, with the openings 28 and 30 in alinement, and a projection 6 is then inserted in the alined openings 28 and 30, and secured in place in any desired manner, as by means of solder. The arm 32 of the guard thus originally extends forward away from the lens-holding clamp 14. The arm 32 is next bent backward across the planes of the lenses carried by the lens-holding members, as shown at 34, so that the said engaging portion of the guard 12 is disposed at the rear of the bridge. The guards may be adjusted in and out to correspond to the adjustment of the bridge.

The lens-holding members 14 are shown as clamps for holding rimless lens. In the modification of Fig. 8, however, the end portions 20 of the bridge are secured to lens-holding rims 36 by means of posts 38 that are soldered both to the rims 36 and intermediate portions of the end portions 20 of the bridge. The guards 12 are of a manufacture similar to the guards heretofore described, except that the free ends of the arms 32 are disposed between the lower ends of the end portions 20 and the lens-holding rims 36 and are secured in place by solder at 40.

It will be understood that the invention may be further modified by persons skilled in the art, and such modifications are considered to be within the spirit and scope of the invention as defined in the appended claims.

What is claimed is:

1. A method of making an ophthalmic mounting that comprises cutting two V-shaped notches in a bar so as to leave a portion of the bar uncut near the vertex of each V, whereby the bar becomes divided into an intermediate portion between the V-shaped notches and two end portions on the other sides of the V-shaped notches, bending the bar at each of the said vertices so as to cause opposite faces of each notch to come into contact, integrally uniting the bent portions of the bar together at the opposite faces of each notch, and attaching a lens-holding member to each of the two end portions.

2. A method of making an ophthalmic mounting that comprises reducing the ends of a bar, cutting two V-shaped notches in the bar so as to leave a portion of the bar uncut near the vertex of each V, cutting an opening in each of two guards, fixing one of the reduced ends in each of the openings, bending the bar at each of the said vertices so as to cause opposite faces of each notch to come into contact, integrally uniting the bent portions of the bar together at the opposite faces of each notch, shaping the bar to form a bridge, shaping the guards so as to adapt them to rest upon a wearer's nose, and providing the mounting with lens-holding members.

3. An ophthalmic mounting comprising a bridge member having an intermediate portion and two end portions joined to the intermediate portion at sharp angles, the intermediate portion being bent upward and outward away from the forehead of the wearer at its middle and having a point of inflexion between the said middle and each end portion, and a lens-holding member and a guard carried by each of the said end portions.

4. An ophthalmic mounting comprising two lens-holding members, a bridge connecting the lens-holding members bent upward and outward away from the forehead of the wearer, and a guard attached to the bridge at the same point as each lens-holding member, each guard extending forward away from its lens-holding member, and then backward across the planes of the lenses carried by the lens-holding members.

5. An ophthalmic mounting comprising two lens-holding members, a bridge connecting the lens-holding members bent upward and outward away from the forehead of the wearer at its middle and having a point of inflexion between said middle and each lens-holding member, and a guard attached near each lens-holding member, each guard extending forward away from its lens-holding member, and then backward across the planes of the lenses carried by the lens-holding members, the bridge being adjustable between the said middle and the points of inflexion and the guards being correspondingly adjustable.

In testimony whereof, I have hereunto subscribed my name.

FREDERICK RICE BISHOP.